(12) United States Patent
Mizoguchi

(10) Patent No.: US 6,961,764 B2
(45) Date of Patent: Nov. 1, 2005

(54) DESCRIPTION DISTRIBUTED COMPUTER SYSTEM AND METHOD OF APPLYING MAINTENANCE THERETO

(75) Inventor: Masatoshi Mizoguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 09/985,775

(22) Filed: Nov. 6, 2001

(65) Prior Publication Data

US 2002/0029265 A1 Mar. 7, 2002

Related U.S. Application Data

(63) Continuation of application No. PCT/JP99/02544, filed on May 14, 1999.

(51) Int. Cl.[7] .......................................... G06E 15/173
(52) U.S. Cl. ..................... 709/223; 709/248
(58) Field of Search ................... 709/201, 217–219, 709/224, 223, 248

(56) References Cited

U.S. PATENT DOCUMENTS

| | | | |
|---|---|---|---|
| 5,860,135 A * | 1/1999 | Sugita | 711/173 |
| 5,909,581 A * | 6/1999 | Park | 717/170 |
| 6,360,254 B1 * | 3/2002 | Linden et al. | 709/219 |
| 6,370,686 B1 * | 4/2002 | Delo et al. | 717/174 |
| 6,397,381 B1 * | 5/2002 | Delo et al. | 717/174 |
| 6,564,369 B1 * | 5/2003 | Hove et al. | 717/121 |
| 6,804,663 B1 * | 10/2004 | Delo | 707/3 |
| 2001/0029605 A1 * | 10/2001 | Forbes et al. | 717/11 |
| 2002/0073414 A1 * | 6/2002 | Sanford | 717/173 |

OTHER PUBLICATIONS

"NETM/DMW-AF 7th edition Kaisetsu Sousasho 3000-3-261-60" (197-12-31) Hitachi, Ltd.

* cited by examiner

Primary Examiner—Zarni Maung
Assistant Examiner—Nghi V. Tran
(74) Attorney, Agent, or Firm—Staas & Halsey LLP

(57) ABSTRACT

When maintenance data is transmitted from a management server computer to client computers to be applied thereto, the client computer searches from within the directories for identification information corresponding to the resource group of the maintenance data and applies the maintenance data to the directory under the detected identification information. Also, the client computer performs periodic monitoring of whether a plurality of items of identical identification information are present or not in its own directories. A flexible distributed computer system of high expansibility while guaranteeing application of the maintenance data to the correct directory is thereby provided.

7 Claims, 14 Drawing Sheets

FIG. 4

| Resource group | Identifier | Relative directory information |
|---|---|---|
| Task A | aaa | aa1···aaprog1<br>aa1···aaprog2<br>aa1···aaprog3 |
| Task B | bbb | bb1···bbprog1<br>bb1···bbprog2<br>bb1···bbprog3<br>bb2···bbdata1<br>bb2···bbdata2 |

FIG. 5

| Resource group | Previous registration date |
|---|---|
| Task A | 980120 |
| Task B | 980120 |

FIG. 6

| Resource group information |
|---|
| Version number information |
| Previous generation registration date |
| Application destination directory information |
| Data file 1 |
| Identifier |
| Relative directory information |
| Application destination directory information |
| Data file 2 |
| Identifier |
| Relative directory information |

| Resource group | Generation information | Registered file name |
|---|---|---|
| Task A | E001 | TaskAE001 |
| Task A | E002 | TaskAE002 |
| Task B | E001 | TaskBE001 |
| Task B | E002 | TaskBE002 |

| Resource group | Current generation | Identifier | Identification directory information |
|---|---|---|---|
| TaskA | E002 | aaa | c:¥aaa |
| TaskB | E002 | bbb | c:¥bbb |

DESCRIPTION DISTRIBUTED COMPUTER SYSTEM AND METHOD OF APPLYING MAINTENANCE THERETO

This is a continuation of Application No. PCT/JP99/02544, filed May. 14, 1999.

TECHNICAL FIELD

In a plurality of remote and/or locally connected computers, the present invention relates to a distributed computer system wherein maintenance of file groups such as programs and user resources etc is performed using communications circuits.

BACKGROUND ART

In a distributed computer system in which a plurality of computers are connected by remote connection and/or local connection, in order to perform alteration or revision of specifications of software (program files and/or data files etc), it is required to alter the files of remote computers by file transfer to a plurality of client computers through communications circuits from a host computer at a center.

For this purpose, there are provided a version management function, file transfer function, and a file application control function applied to files such as files grouped in maintenance units; in financial systems of high reliability required in financial institutions etc, a remote maintenance system is desired in which occurrence of errors is prevented to the utmost, yet which does not require human intervention for registration and transfer of maintenance data.

FIG. 23 is a view showing an example layout of a distributed computer system provided in a financial institution or the like. In FIG. 23, the distributed computer system has a triple layer structure comprising a management server computer 200 provided at a centralization center, a plurality of relay computers 400 provided at branch offices remotely connected to host computer 200 through communication circuits, and a plurality of client computers 300 locally connected by means of a LAN etc to the relay computers 400 at each branch office. Also, a management client computer 100 is connected to management server computer 200 at the centralization center. Management client computer 100 is used for preparation of maintenance data for updating/correction of task programs or data files employed by client computers 300, and is a device of the same type as client computers 300, such as a personal computer or workstation etc. The maintenance data generated by management client computer 100 is distributed to the client computers 300 from management server computer 200 through relay computers 400. At this point, prescribed directory information is appended to the distributed maintenance data. Then, updating of the maintenance data at each client computer 300 is performed by copying the distributed maintenance data to the directory corresponding to this appended directory information. In this way, efficient updating of the maintenance data is achieved by distribution of the maintenance data from the host computer to the client computers.

However, when maintenance data distribution is performed as described above, the directory of the maintenance data in each client computer must be the same for all the client computers to which distribution is effected. However, in modern distributed computer systems, sometimes a plurality of systems of different types are combined in composite fashion or systems of different types are added on after the system has been introduced; in such cases, the directory to which the maintenance data is to be applied may be different in the respective client computers. For example, if a memory device is added to a client computer, the directory may be altered by alteration of the drive name of the storage device in which the maintenance data is stored. In such an environment, in the case of a remote maintenance system mechanism which was conventionally required to be constituted by a single system structure, it could happen that maintenance data updating by maintenance data distribution might become impossible, making it impossible to cope with a composite distributed computer system in which each client computer has its own directory structure.

An object of the present invention is therefore to provide a distributed computer system wherein maintenance data can be correctly applied to a plurality of respective client computers even when the directories to which the maintenance data is to be applied are different.

DISCLOSURE OF THE INVENTION

The construction of a distributed computer system according to the present invention for achieving the above object comprises: a plurality of client computers in which is stored a file group including files managed in each resource group under a directory constituted by a plurality of layers; and a server computer that transfers to each of the client computers maintenance data for updating files managed in each of the resource groups; in which the client computers comprise: an application section that, when the maintenance data is transferred from the server computer, detects identification information that identifies the resource group contained in the maintenance data that was transferred from the directory, and applies the maintenance data that has been transferred to a directory under this identification information that has thus been detected; and a monitoring and notification section that executes monitoring to ascertain whether or not a plurality of items of identical identification information are present in the directories and, if a plurality of items of identical identification information are present, notifies the server computer of abnormality.

Specifically, the application section searches for the layer, of the directories, that has the identification information, and generates the maintenance target directory for applying the maintenance data by adding a second directory portion which was registered beforehand, under the first directory portion from the topmost layer of the directories as far as the level having the identification information contained in the maintenance data which was transferred, and applies the maintenance data which was transferred to this maintenance target directory.

Specifically, when the maintenance data is applied by sending maintenance data from the management server computer to the client computer, the client computer searches from among the directories for identification information corresponding to the resource group of the maintenance data and generates the maintenance target directory by adding relative directory information that has been registered beforehand under the identification information that has thus been detected, and applies the maintenance data thereto. In this way, even if the application destination directories for the maintenance data are different for each of the client computers, the maintenance data can be applied to the correct directory. It is thereby made possible to cope with a composite distributed computer system in which a plurality of client computers have respectively individual directory systems, thereby enabling a flexible distributed computer system of a high degree of expansibility to be constructed.

Also, the client computers perform periodic monitoring to ascertain whether or not a plurality of identical items of identification information are present in their own directories. If they do find a plurality of such items of identification information in their directories, they notify this abnormality to the management server. The maintenance data is thereby prevented from being wrongly applied, and application of maintenance data to the correct directory is guaranteed.

It is a presupposition of the present system in this entire distributed system which is organized as a network that only a single item of specified identification information is allowed to be present in a computer unit. This system has a function whereby identification information is uniquely defined and managed through the entire network.

The identification information is expressed as a combination of a series of letters, but, in order for this to be identified as unique information in the network, may also include characteristic information for identifying this as being system information, information defined in task terms, and identification information.

BRIEF DESCRIPTION OF THE DRAWINGS

FIG. 4 is a view showing an example of a registration information table;

FIG. 5 is a view showing an example of a previous registration date table;

FIG. 6 is a view showing an example of the data structure of maintenance data;

BEST MODE FOR CARRYING OUT THE INVENTION

An embodiment of the present invention is described below with reference to the drawings. However, the technical scope of the present invention is not restricted to this embodiment.

Figure 1:
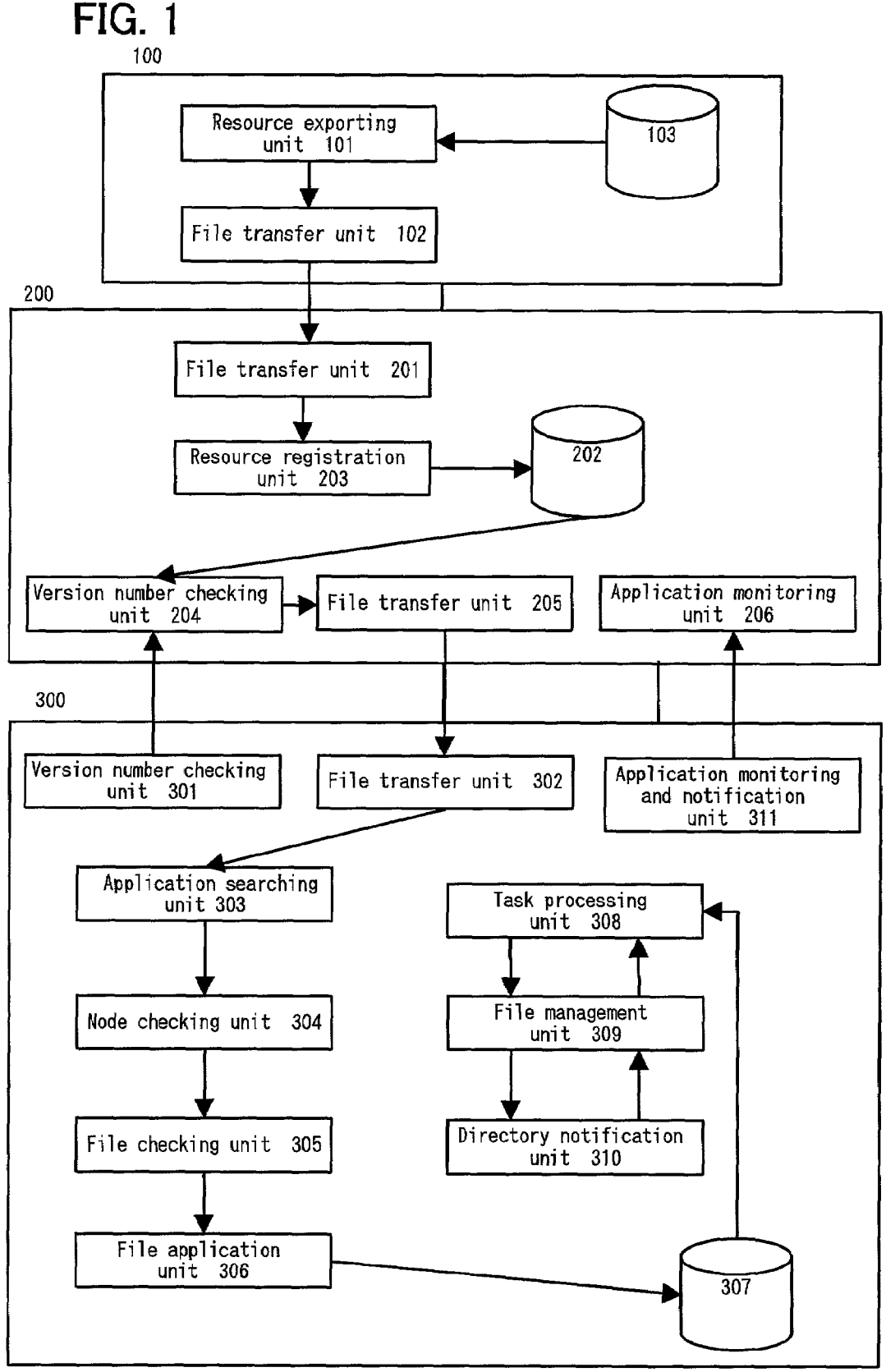
FIG. 1 is a block layout diagram of a distributed computer system according to the present invention.

FIG. 1 is a block layout diagram of a distributed computer system according to the present invention. In FIG. 1, a distributed computer system comprises a management client computer (hereinbelow called management client) 100, a management server computer (hereinbelow called management server) 200 and client computer (hereinbelow called client) 300. Management client 100 is connected to management server 200 and is provided together with management server 200 in the center where management server 200 is provided. A plurality of remotely arranged clients 300 (only a single client 300 is shown in FIG. 1) may be connected through communication circuits to management server 200. Also, at least one relay computer (not shown), which is remotely arranged, may be connected to management server 200 through a communications circuit, a plurality of clients 300 being locally connected to this relay computer. Hereinbelow, according to an embodiment of the present invention, a two-layer distributed computer system of the server client type in which relay computers are omitted is described.

Management client 100 is in principle for example the same type of device as clients 300. The operator prepares data files of maintenance data using management client 100, and stores these in database 103 of management client 100. In more detail, the data files are stored under a directory having its own identification information, identification information for identifying maintenance data which is managed for each prescribed resource group being supplied beforehand. Resource exporting section 101 of management client 100 then extracts the data files from database 103 of management client 100, and generates the maintenance data by appending thereto various items of information, to be described. File transfer section 102 transfers the maintenance data which is thus generated to maintenance server 200.

File transfer section 201 of management server 200 receives the maintenance data transferred from file transfer section 101 of management client 100, and resource registering section 203 registers this maintenance data which has thus been received in a database 202 of management server 200. In addition, version number checking section 204 receives from version number checking section 301 of client 300 version number information of the maintenance data stored in database 307 of the client, and compares this version number with the version number of the maintenance data stored in database 202. If the version number of the maintenance data stored in database 202 is more recent than the current version number of the maintenance data provided at client 300, version number checking section 204 instructs file transfer section 205 to perform file transfer. When file transfer section 205 receives the instructions to perform file transfer from version checking section 204, it transmits the maintenance data to clients 300. Application monitoring section 206 will be described later.

Version number checking section 301 of client 300 reads the current version number information of the maintenance data provided in client 300 and instructs version checking section 204 of the management server to perform a version number check. File transfer section 302 receives the maintenance data distributed from maintenance server 200. Application searching section 303 uses the identification data of the maintenance data to search for the directory to which the maintenance data that has been received is to be applied. The identification information is information for identifying collections of maintenance data in each resource group and constitutes part of the directory in which the maintenance data is stored.

Figure 2:
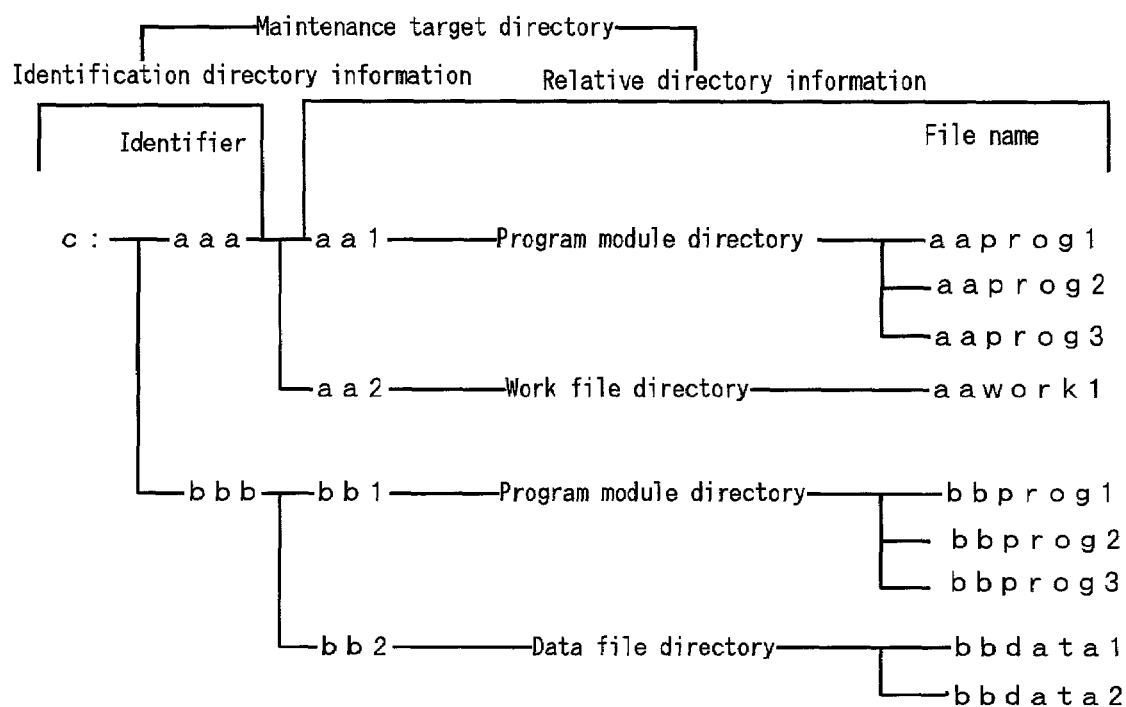
FIG. 2 is a diagram given in explanation of a directory structure.

FIG. 2 is a diagram illustrating the directory structure. The directories have a tree structure having a plurality of layers; the directory information comprises, in the uppermost layer, the name in the computer of for example at least one storage device (magnetic disk or the like) (for example drive C or drive D etc) comprising a database in which a file group including the maintenance data is stored; in the layer below this, identification information for identifying maintenance data; and, furthermore, in the layer therebelow, directory names whereby partitioning is effected in each storage device; the file names are provided in the lowest layer.

Consequently, application searching section 303 searches for information (identification directory information) from the uppermost layer to the layer of the identification information in all the directory information of database 307 and, when it finds the directory having the identification information, generates the maintenance target directory by appending previously registered relative directory information below the layer of the identification information. The relative directory information is constituted by the directory name of the layer below the identification directory information and the file name. File application section 306 of application searching section 303 then copies the maintenance data to this maintenance target directory (this will also be called "applying" the maintenance data, after a node check has been performed by a node checking section 304, to be described, and a file check has been performed by file checking section 305.

In this way, in this embodiment of the present invention, the directory corresponding to the maintenance data is searched for using the identification information and when the directory having the identification information is found, the maintenance data is copied to the maintenance target directory having this identification information. Consequently, even in the case for example where a memory device comprising a database of each client is added, or a system is introduced in which the directory structure of the database is different, so that the information of the directory where the maintenance data is stored is different at each client, it is possible to find the maintenance data directory that is to be the subject of update by searching for the identification information that is uniquely applied to each resource group in respect of the maintenance data, and furthermore the directories in which the maintenance data is stored can be unified.

For example, if, as conventionally, an application address directory is specified by the full address information, for example in a case where, on initially introducing the system, the maintenance data corresponding to certain identification information was stored in drive C, but the storage destination of this maintenance data was then altered to an added drive D, this would then not be capable of being detected, with the result that application of maintenance data became impossible. In contrast, with the present embodiment of the invention, the identification information is detected from the directory in drive D which is the target of alteration, making it possible to correctly apply the maintenance data to the directory under the identification information. Also, even in cases where the directory information in another layer of the directories is different from the directory that is to be the target of application, it becomes possible to apply the maintenance data in the same way.

At this point, if a plurality of items of identical identification information are present in the directory structure of database 307 of a particular client 300 (for example a directory is present having the same identification information aaa in both the C drive and the D drive of a database 307), the directory in which the maintenance data is to be stored corresponding to the identification information cannot be uniquely specified. That is, the directory in which the maintenance data is to be stored cannot be identified using the identification information. Also, if maintenance data is stored in a directory corresponding to the identification information previously detected by the application searching section 303, there is a possibility that this directory may not be the directory in which the maintenance data in fact ought to be stored. In order to prevent occurrence of such an abnormal situation, a function is necessary whereby all the directories of the database 307 are monitored at prescribed intervals, and if a plurality of items of identical identification information are present, notification of this abnormality is given.

Application monitoring and notification section 311 of client 300 for example periodically searches all the directories of database 307 and, if a plurality of identical items of identification information are detected, gives notification of this abnormality to application monitoring section 206 of management server 200. When such an abnormality notification is received, application monitoring section 206 for example notifies the operator of the management server 200 of the abnormality by displaying an abnormality notification on the monitor of management server 200. The operator then for example gives a prescribed warning to the client where the abnormality was generated, to seek alteration of the identification information. The abnormality is eliminated by the operator of the client 300 which receives a warning altering the identification information.

In this way, normal functioning of the search for the destination directory to which the maintenance data is to be applied, based on the identification information in the application of searching section 301 described above is guaranteed by periodic monitoring of all the directories of database 307 as to whether or not a plurality of identical items of identification information are present to ensure that a plurality of identical items of identification information are not present in the directories in database 307.

Also, task processing section 308 performs processing of typical tasks (word processing and/or spreadsheet calculation etc) that are executed at clients 300. File management section 309 performs opening processing of files which are to be read or written by task processing section 308. Directory notification section 310 then gives notification of the directory of the file that is to be opened by file management section 309, based on the identification information notified thereto from file management section 309.

In this way, even when the file of maintenance data is opened at client 300 in order to perform an ordinary task, file opening processing may be performed requesting the entire directory name of the prescribed file by performing a search using the identification information, without the entire directory name of the file being specified. In this way, access processing of the file by client 300 is unified in the searching processing using the identification information, so a simplification of the system can be achieved.

Figure 3:
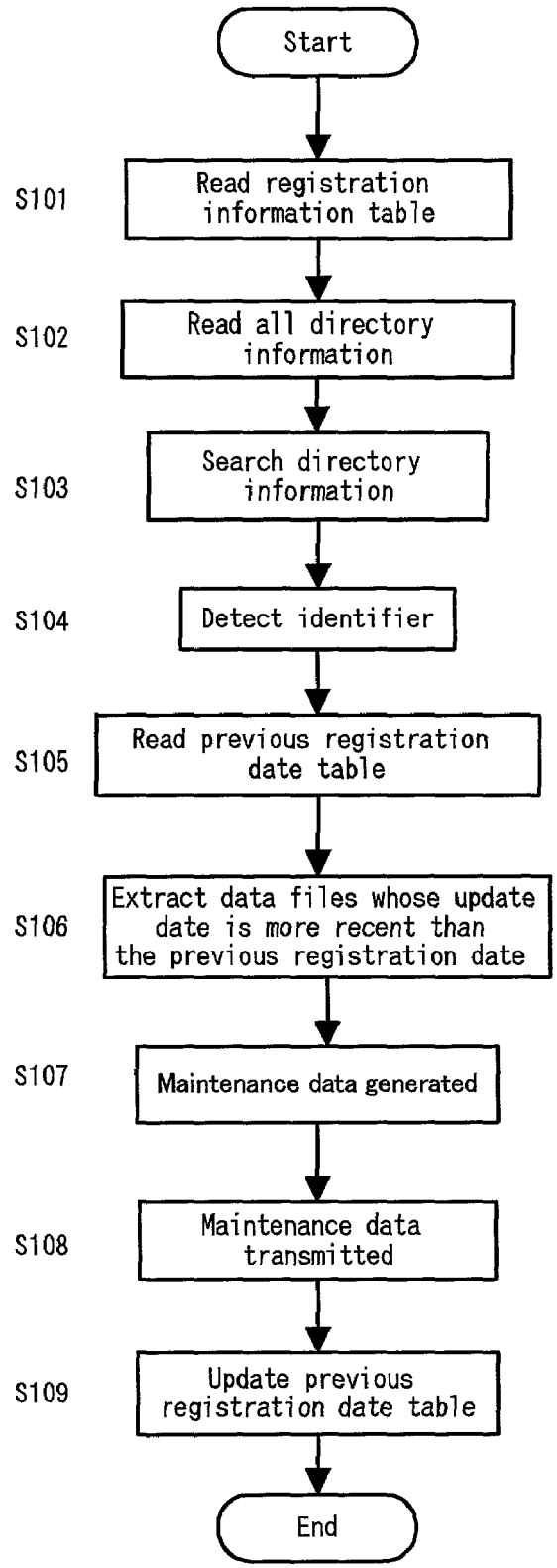
FIG. 3 is an operation flow chart of a resource exporting section 101 and a file transfer section 102 of a management client 100.

A detailed description of the respective operations of the various sections will now be given. FIG. 3 is an operation flow chart of resource exporting section 101 and file transfer section 102 of management client 100. In step S101, resource exporting section 101 reads the registration information table from the file group of database 103. FIG. 4 is a view showing an example registration information table. The registration information table comprises identification information corresponding to each resource group and relative directory information. As described above, the identification information is information for identifying the maintenance data of each resource group and constitutes part of the directory information. Also, the relative directory information is directory information of the layer below the layer of the identification information in the entire directory name of the maintenance data. The registration information table is registered beforehand in database 103 of management client 100.

In step S102, the entire directory information of database 103 is read and, in step S103, the directory information having the identification information registered in the registration information table is searched for. At this point, as described above, resource exporting section 101, of the directory information having the structure shown in FIG. 2, searches for the directory information having the identification information, from the directory information from the top layer as far as the layer of the identification information.

In step S104, when it detects directory information having the identification information registered in the registration information table, resource exporting section 101 generates the maintenance target directory by adding the relative directory information to the identification directory information (directory information from the top layer as far as the layer of the identification information) which it has thus detected.

Next, in step S105, resource exporting section 101 reads the previous registration date corresponding to the resource group name from the previous registration date table stored in the file group of database 103. FIG. 5 is a view showing an example of a previous registration date table. As shown in FIG. 5, the previously updated date information of the maintenance data is registered for each resource group in the previous registration date table. Then, in step S106, resource exporting section 101, of the maintenance data associated with the identification directory information detected in step S104 above, extracts data files whose date of updating is more recent than the previous registration date.

It should be noted that the file management functions of the operating systems of current computer systems (Unix, MS-Dos, Windows etc) include a function of recording the date of updating a data file, so if such an OS is loaded this function is used.

Then, in step S107, the resource group information, version number information, previous generation registration date, application destination directory information, identification information, and relative directory information are appended to the data file extracted in step S106. The data file with these items of information appended is stored in the maintenance target directory as maintenance data.

FIG. 6 is a view showing an example of the data structure of the maintenance data. In FIG. 6, maintenance data is generated for each resource group; each item of maintenance data has its generation information i.e. version information and previous generation registration date. In step S107, the application destination directory information, identification information, and relative directory information are then added to each extracted data file. The application destination directory information is the full address when the maintenance data is stored in management client 100. Since the system is constituted under the assumption that management client 100 and the clients 300 are in principle identical items of equipment, at least on first installation of the computer system, the application destination directories of the maintenance data in the management client 100 and clients 300 are in principle the same.

In step S108, file transfer section 102 sends the generated maintenance data to file transfer section 201 of management server 200. In step S109, file transfer section 102 updates the previous registration date table in the previous registration date table of FIG. 5 corresponding to the resource group of the maintenance data that has been transferred to the current date.

Figure 7:
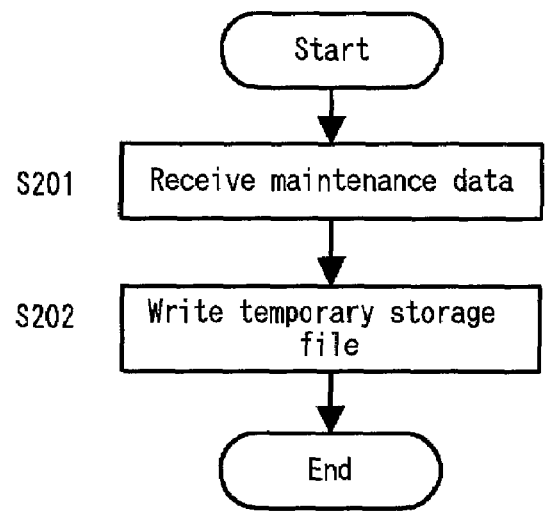
FIG. 7 is an operation flow chart of a file transfer section 201 of a management server 200.

FIG. 7 is an operation flow chart of file transfer section 201 of management server 200. In step S201, file transfer section 201 receives maintenance data from a file transfer section 102 of management client 100. Then, in step S202, the management data that has been sent from file transfer section 102 of management client 100 is written to a temporary storage file of file transfer section 201 of management server 200.

Figure 8:
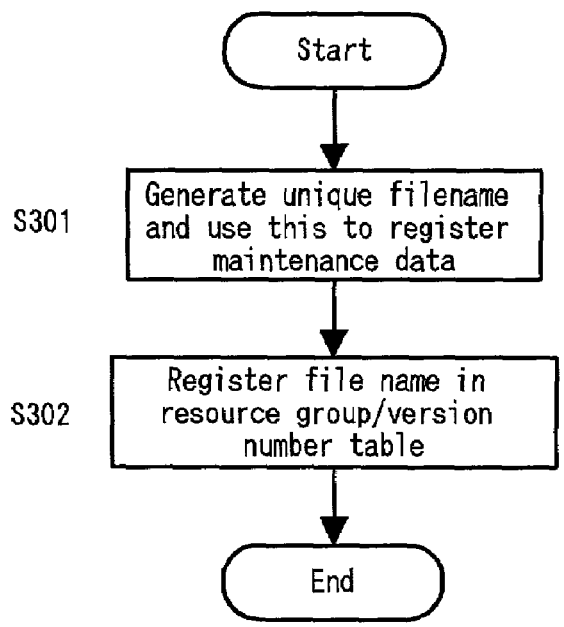
FIG. 8 is an operation flow chart of a resource registration section 203.
Figures 9, 10, 11:
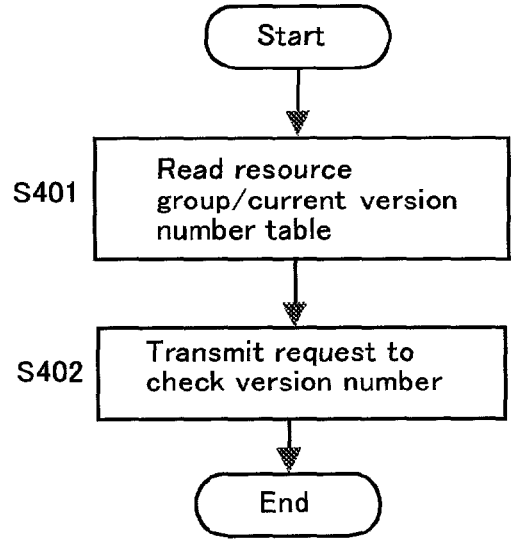
FIG. 9 is a view showing an example of a resource group-generation table.
FIG. 10 is an operation flow chart of a version checking section 301 of a client 300.
FIG. 11 is a view showing an example of a resource group-generation table.

FIG. 8 is an operation flow chart of resource registration section 203. In FIG. 8, in step S301, a unique file name for the maintenance data that is temporarily stored in a file transfer section 201 is generated using resource group information and version number information contained in the maintenance data, and the maintenance data is then stored in a management file of database 202 of management server 200 under this file name. In step S302, resource registration section 203 registers the file name generated in step S301 above corresponding to the resource group information and generation information in the resource group/ generation table, which is stored in database 202. FIG. 9 is a view showing an example of a resource group/generation table. In FIG. 9, the file name corresponding to the resource group information and version number information is registered.

FIG. 10 is an operation flow chart of version number checking section 301 of client 300. In step S401, the version number of checking section 301 of client 300 reads the resource group/current generation table from the file group of database 307 of client 300. FIG. 11 is a view showing an example of a resource group/generation table. In FIG. 11, the resource group/generation table comprises, for each resource group, the current version number (current generation) of the maintenance data corresponding thereto, identification information and identification directory information. The identification directory information is directory information of the layers from the top layer of the directory as far as the identification information.

Then, in step S402, version number checking section 301 requests version number checking of the resource group that is read from the resource group/generation table and of the current generation information of the maintenance data corresponding thereto, and sends this to version number checking section 204 of management server 200.

Figure 12:
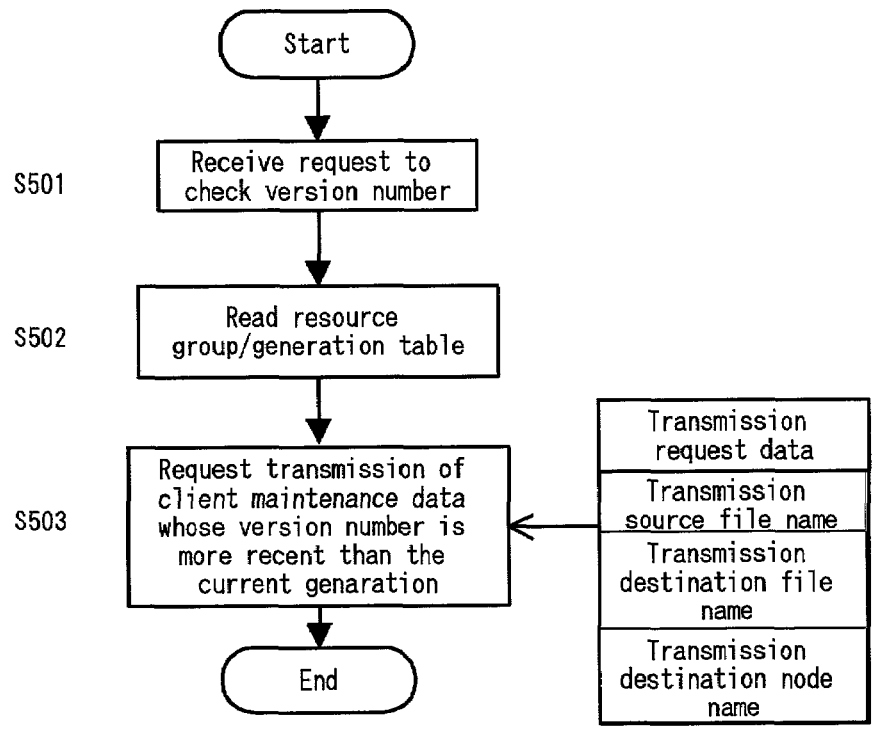
FIG. 12 is an operation flow chart of a version number checking section 204 of management server 200.

FIG. 12 is an operation flow chart of in the version number checking section 204 of management server 200. Version number checking section 204 reads the resource group/generation table (see FIG. 9) of database 202 in step S502 when it receives a version number checking request from version number checking section 204 of management server 200. In step S503, version number checking section 204, if there is a more recent version number in the resource group/generation table that has thus been read than the current version number of the resource group whose version number checking has been requested, requests file transfer section 205 to transmit the maintenance data of this more recent version number. As shown in Figure, the transmission request data comprises the transmission request command, transmission source file name, transmission destination file name, and address node name information. The transmission source file name is the file name of the maintenance data stored in database 202. The transmission destination file name is the file name of the directory where the maintenance data is stored in the transmission destination client 300. The address node name is the name or number etc of the transmission destination client 300.

Figure 13:
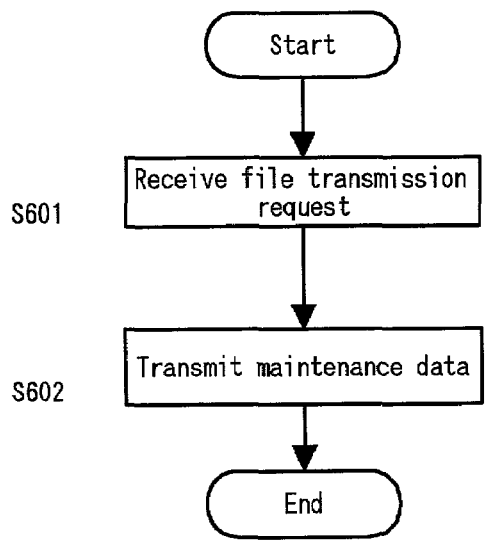
FIG. 13 is an operation flow chart of a file transfer section 205 of management server 200.

FIG. 13 is an operation flow chart of file transfer section 205 of management server 200. When, in step S601, file transfer section 205 receives a file transmission request from version number checking section 204 of management server 200, in step S602, it reads the maintenance data corresponding to the transmission source file name in the transmission request data, and transmits this to file transfer section 302 of client 300. The maintenance data that is transmitted from file transfer section 205 of management server 200 is then written to a temporary storage file of file transfer section 302 of client 300.

Figure 14:
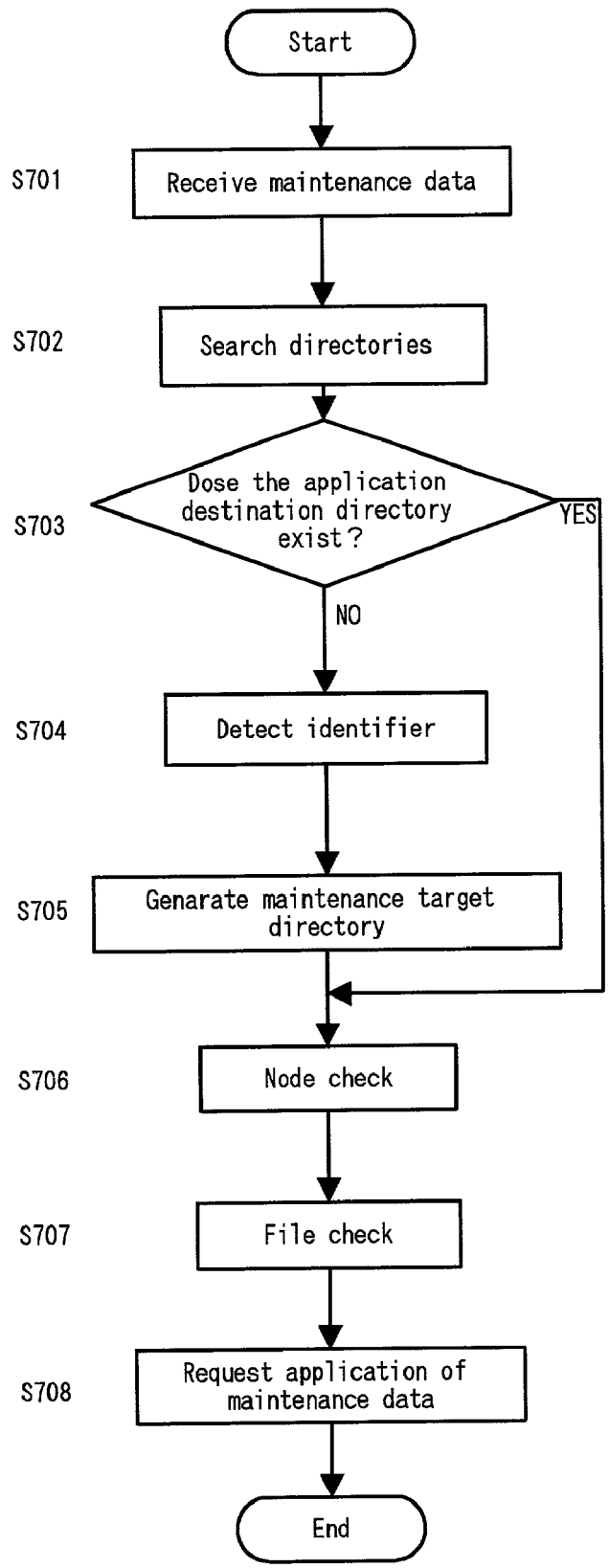
FIG. 14 is an operation flow chart of an application searching section 303 of a client 300.

FIG. 14 is an operation flow chart of application searching section 303 of client 300. In step S701, application searching section 303 receives maintenance data from file transfer section 302. In step 702, all the directories of database 307 of client 300 are then searched to ascertain whether the application destination directory included in the maintenance data exists. In step S703, if the application destination directory exists, processing advances to step S706, to be described. On the other hand, if, in step S703, the application destination directory is not detected, processing advances to step S704, in which a search is made for the directory having the identification information contained in the maintenance data. When the directory having the identification information is detected, in step S705, the maintenance target directory is generated by adding the relative directory information to the directory information (identification directory information) of the layers from the uppermost detected directory layer as far as the identification information. Then, in step S706, a node check request is made to a node checking section 304, to be described, and, in step S707, a file check request is made to a file checking section 305, to be described; if notifications "OK to apply" are respectively received, in step S708, a request to apply the maintenance data is made to file application section 306.

Figure 15:
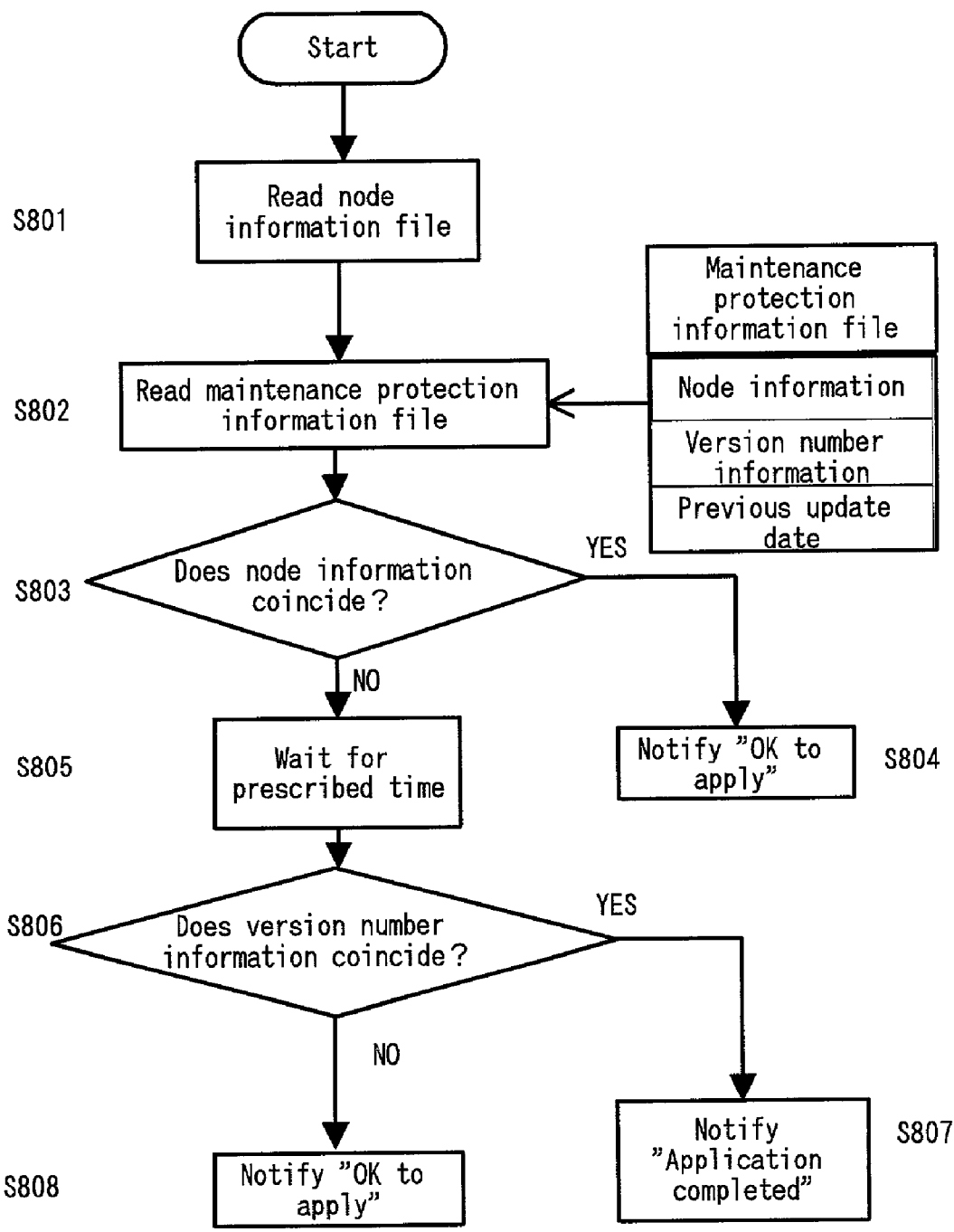
FIG. 15 is an operation flow chart of a node checking section 304.

FIG. 15 is an operation flow chart of node checking section 304. In step S801, node checking section 304 reads its own node information which is registered beforehand in node information file of database 307. The node information is the name and/or number etc of the client. In step S802, the maintenance data protection information file registered in database 307 is read. The maintenance data protection file is a file that is prepared in order to prevent a plurality of clients from concurrently accessing a shared file, when there are files in the database that are shared by a plurality of clients; the node information of one or other of the plurality of clients, the current version number information of this file and the date of previous update information etc are registered therein.

Then, in step S803, node checking section 304 ascertains whether or not the node information of the maintenance data protection information file that has thus been read coincides with its own node information. If it coincides, in step S804, it sends a notification "OK to apply" to application searching section 303. If it does not coincide, in step S805, it executes waiting for a prescribed time. After lapse of a prescribed time, in step S806, it ascertains whether or not the version number information registered in the maintenance protection information file coincides with the version number information contained in the maintenance data. If it does coincide, in step S807, it transmits a notification "application completed" to the application searching section 303. That is, some other node (client) that accessed this shared file during the prescribed waiting period has executed maintenance data application processing and updated the version number information of the maintenance protection information file, so the current version number information of the maintenance protection information file coincides with the version number information contained in the maintenance data. If it does not coincide, in step S808, a notification "OK to apply" is sent to application searching section 303.

Figure 16:
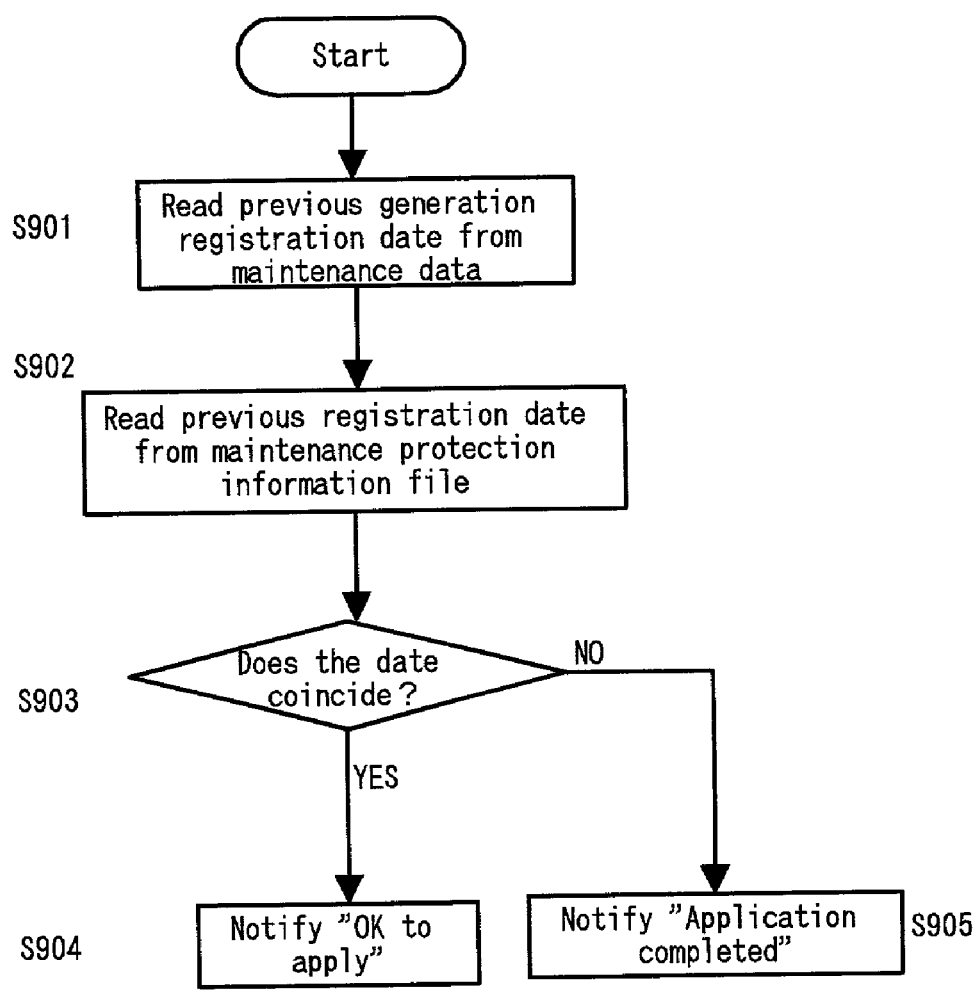
FIG. 16 is an operation flow chart of a file checking section 305.

FIG. 16 is an operation flow chart of file checking section 305. In step S901, file checking section 305 reads the previous generation registration date from the maintenance data. Furthermore, in step S902, it reads the previous registration date from the maintenance protection information file. In step S903, it ascertains whether or not the two dates that have been thus read coincide; if they coincide, in step S904, it sends a notification "OK to apply" to application searching section 303. If they do not coincide, in step S905, it sends a notification "application completed" to the application searching section 303. This constitutes the processing for reconfirming that the applied maintenance data is the most recent maintenance data.

Figure 17:
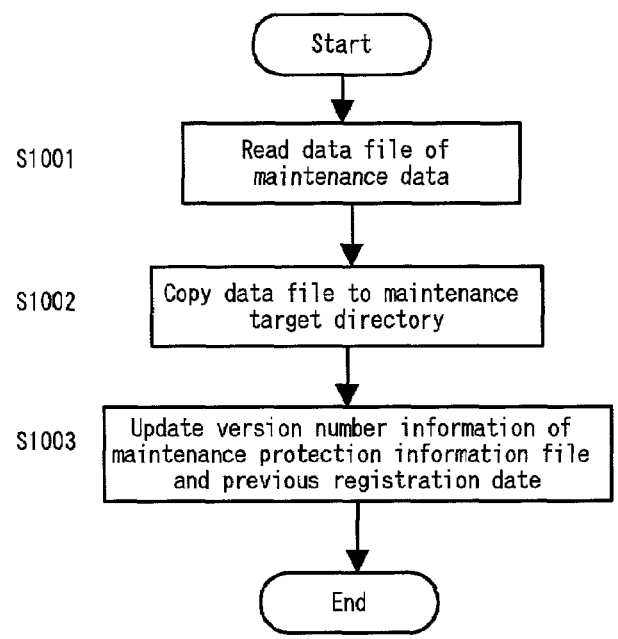
FIG. 17 is an operation flow chart of a file application section 306.

FIG. 17 is an operation flow chart of file application section 306. In step S1001, file application section 306 reads the data file contained in the maintenance data from the file transfer section 302. In step S1002, it copies this data file (in other words, applies the maintenance data) to the maintenance target directory (or application destination directory). Then, in step S1003, it updates the current version number information and previous registration date of the maintenance data protection information file to the version number information and previous registration date contained in the maintenance data.

Figure 18:
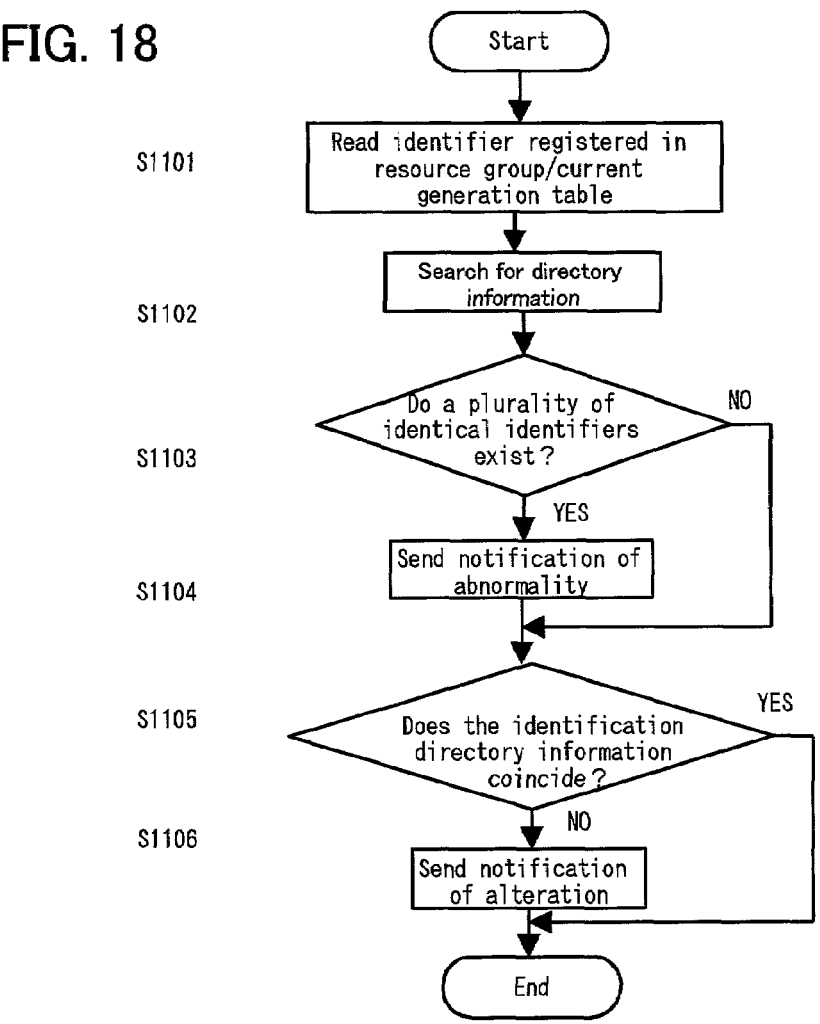
FIG. 18 is an operation flow chart of an application monitoring and notification section 311.

FIG. 18 is an operation flow chart of application monitoring and notification section 311. Application monitoring section 311 operates in accordance with the following flow chart at fixed time intervals, triggered by turning on of the power source of a client 300, or a request to commence remote maintenance made to management server 200 by a prescribed operation in respect of client 300.

In step S1101, application monitoring and notification section 311 reads from database 307 of client 300 identification information registered in the resource group/current generation table of FIG. 11. In step S1102, it searches all the directories of database 307 for the level of the identification information 307. In step 1103, if a plurality of identical items of identification information are detected, it transmits to the application monitoring section 306 of management server 200 a notification of abnormality. The notification of abnormality includes for example the identification information and the node name information.

Also, in step S1104, the identification directory information corresponding to the identification information present in only a single one of all of the directories and the identification directory information registered in the resource group/current generation table are compared. Then, in step S1105, if these two are different, a notification of alteration is transmitted to application monitoring section 306. The notification of alteration comprises for example identification information, node name and identification directory information. The situation that these two are different can arise for example if a storage device is added to a client 300 after the previous updating, causing the drive name of the storage device in which the maintenance data is stored to be altered.

Figure 19:
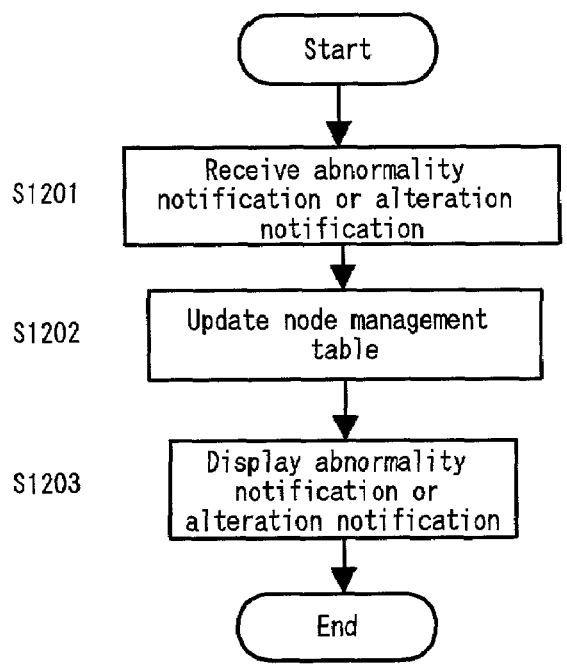
FIG. 19 is an operation flow chart of application monitoring section 206 of management server 200.

FIG. 19 is an operation flow chart of application monitoring section 206 of management server 200. When, in step S1201, application monitoring section 206 receives an abnormality notification or alteration notification from application monitoring and notification section 311 of client 300, in step S1202, the node management table stored in database 202 of management server 200 is updated. The node management table comprises for example information such as node name, resource group, identification information, identification directory information, condition, and reception time; when abnormality notifications or alteration notifications are received, application monitoring section 206 records the time of reception of each notification, identifying the node name and the condition corresponding to the identification information included in the received notification as "abnormality" or "alteration".

Then, in step S1203, application monitoring section 206 displays an abnormality notification or alteration notification on the monitor screen of management server 200, and notifies the operator of the management server 200 that an abnormality notification or alteration notification has been transmitted. Also, if an abnormality notification is displayed on the monitor screen, a warning notification is given to the operator of client 300. The warning notification may be transmitted by telephone to the operator of client 300 from the operator of management server 200, or may be transferred to client 300 from the management server 200 as data. In this way, the operator of client 300 is made aware of the existence of a plurality of items of identical identification information and therefore arranges for such existence of a plurality of items of identical identification information to be eliminated by for example, of the plurality of items of identical identification information existing, altering the identification information of the directory that does not contain maintenance data. In this way, it is possible to ensure that searching for the maintenance data application destination directory using the identification information in the application searching section 301 described above functions normally, by guaranteeing that only a single copy of a particular item of identification information exists in database 307.

Figure 20:
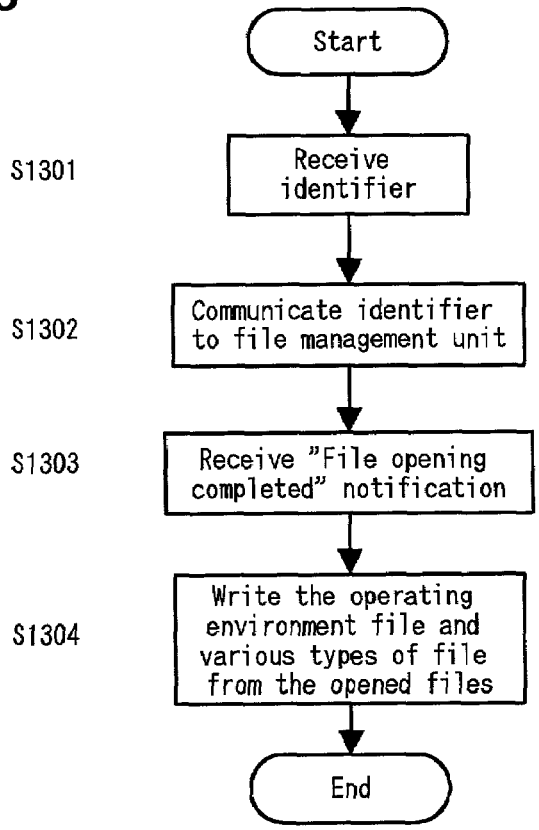
FIG. 20 is an operation flow chart of task processing section 308.

FIG. 20 is an operation flow chart of task processing section 308. When, in step S1301, task processing section 308 receives the identification information that has been notified thereto as start-up parameters or that has been set in its own program, in step S1302, it notifies file management section 309 of a file opening request and of the identification information. As will be described, file management section 309 in addition notifies directory notification section 310 of the identification information, opens the file corresponding to the directory information that has been communicated thereto from the directory notification section, and sends a "file opening completed" notification to the task processing section 308. Task processing section 308, when it receives in step S1303 this "file opening completed" notification, reads, in step S1304, the operating environment file from the file that has thus been opened, and, in addition, reads and writes various files.

In this way, task processing section (an ordinary task application program) 308 is enabled to perform file access by a relative directory information search constituting the method of file searching of the present invention, without altering the processing structure that is aware of the absolute directory path that is characteristic of the equipment.

Figure 21:
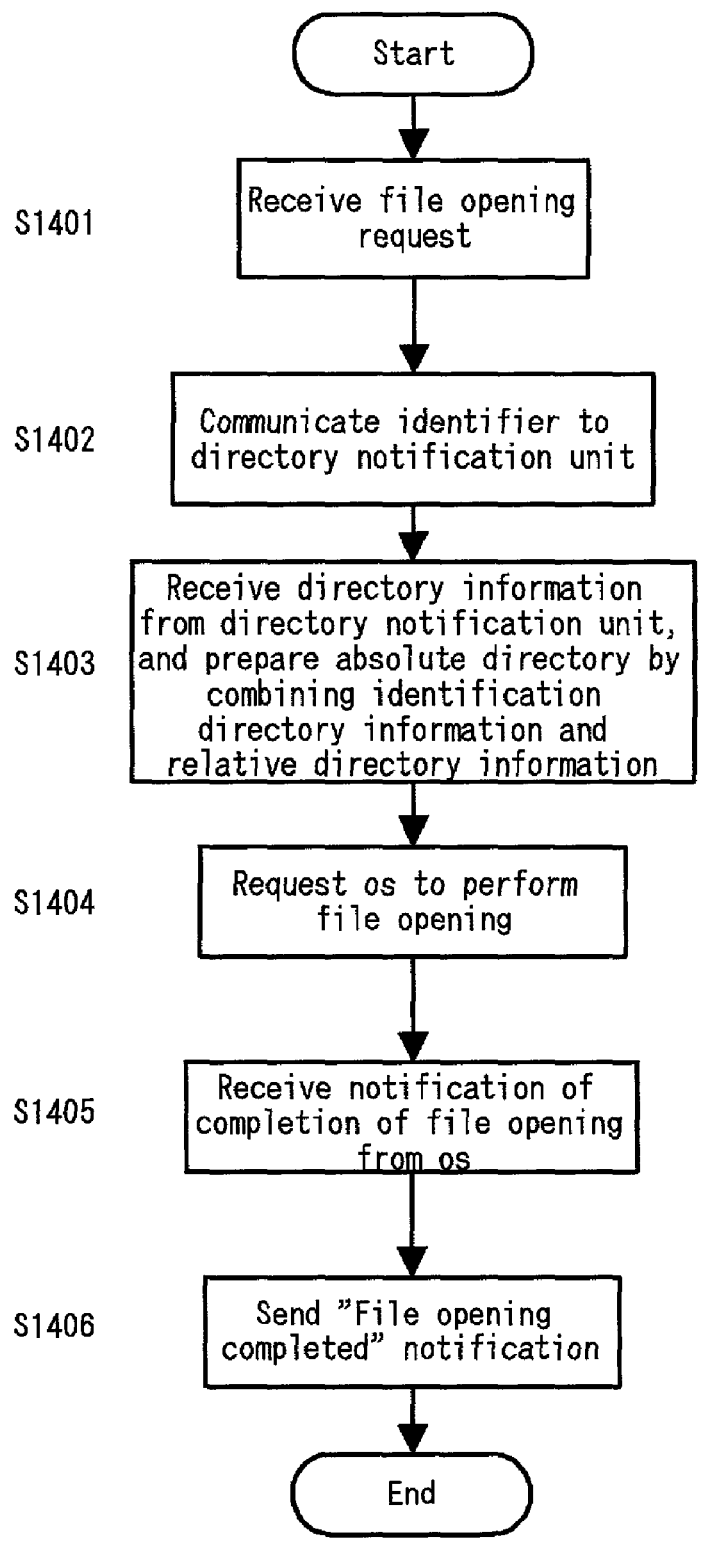
FIG. 21 is an operation flow chart of file management section 309.

FIG. 21 is an operating flow chart of file management section 309. In step S1401, file management section 309, when it receives a file opening request from task processing section 308, in step S1402, notifies directory notification section 310 of the identification information included in the file opening request. In step S1403, it receives the directory information detected by searching by directory notification section 310, to be described, and prepares the full path name (absolute directory) by combining the relative directory information below the identification information with the absolute directory information (identification directory information) as far as the identification information that has been notified thereto. In step S1404, it issues a file opening request to the operating system (OS). In step S1405, it receives a file opening completion notification from the operating system. In step S1406, it sends a "file opening completed" notification to task processing section 308.

Figure 22:
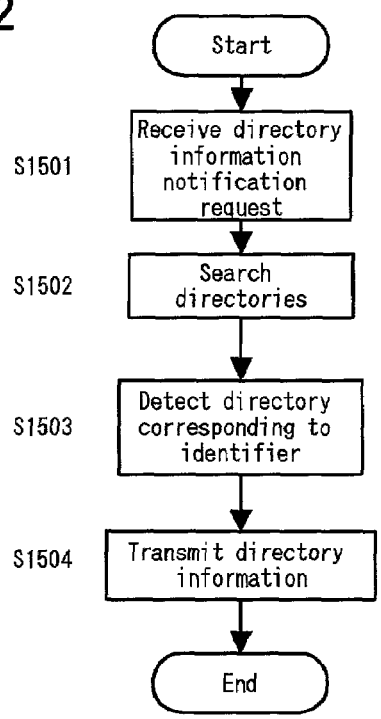
FIG. 22 is an operation flow chart of a directory notification section 310.

FIG. 22 is an operating flow chart of directory notification section 310. In step S1501, when directory notification section 310 receives identification information and a directory information notification request, in step S1502, it reads the directory information of database 307, and searches for the directory having the identification information. In step S1503, when the directory having the identification information is detected, in step S1504, it notifies file management section 309 of the absolute directory information constituting the full path of this directory.

In this way, even in file access processing by task processing section 308, file detection corresponding to the identification information is performed by directory searching using the identification information. Consequently, not just in the case of maintenance data update, but even in the case of ordinary task processing, file detection is performed by file searching using this identification information and the method of file access processing is thereby unified for the entire distributed computer system; this therefore is associated with simplification and stabilization of the system.

Figure 23:
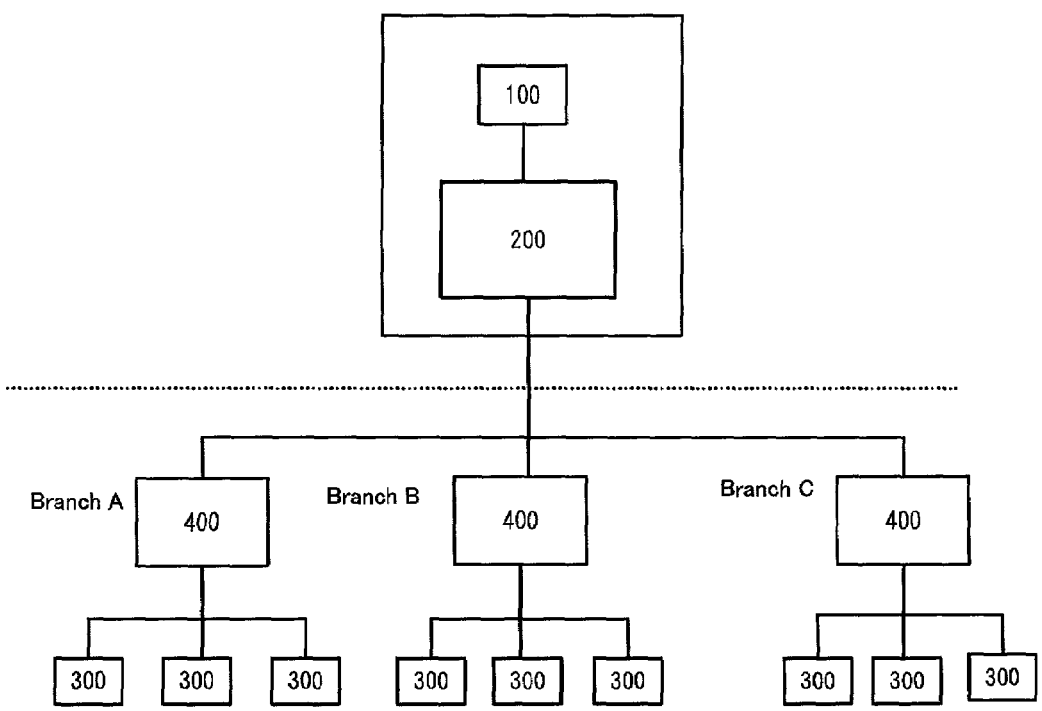
FIG. 23 is a view showing an example of the layout of a distributed computer system.

In this embodiment of the present invention, a server client type two-layer distributed computer system was described; however, it could also be applied to a three-layer distributed computer system of the server/relay computer/ client type, in which a relay computer (reference numeral 400 in FIG. 23) is interposed between the server and client. Also, if the relay computer is regarded as a client, the present invention could be applied also between the server and relay computer.

Also, the present invention could be applied to uses in which the maintenance data is directly applied from the client 300 by the operator of client 300 utilizing file transfer section 302, without performing a version number check.

INDUSTRIAL APPLICABILITY

As described above, according to the present invention, when maintenance data is applied by sending maintenance data to a client computer from the management server computer, the maintenance data is applied thereto by generating the maintenance target directory by means of the client computer searching for identification information corresponding to the resource group of the maintenance data from among the directories, and adding, under the detected identification information relative directory, information which has been registered beforehand. In this way, even if the application destination directory of the maintenance data is different for each client computer, it is possible to apply the maintenance data to the correct directory. Consequently, application to a composite distributed computer system in which a plurality of client computers respectively have their own characteristic directory structures becomes possible, making it possible to construct a flexible distributed computer system of a high degree of expansibility.

Also, the client computer performs periodic monitoring to ascertain whether a plurality of identical items of identification information exist in its own directories. If a plurality of items of identification information are found in the directories, abnormality is notified to the management server. In this way, the maintenance data is prevented from being wrongly applied, and application of the maintenance data to the correct directory is guaranteed.

What is claimed is:

1. A distributed computer system comprising:
    a plurality of client computers in which is stored a file group including files managed in each resource group under a directory constituted by a plurality of layers;
    a management computer that manages generated maintenance data, according to a process comprising:
        storing previous file update management information for each said resource group of said group of files,
        extracting of said generated maintenance data, maintenance data having file update management information more recent than said previous file update management information; and
        transferring the extracted maintenance data to said server computer;
    a server computer that transfers to each of the client computers maintenance data for updating files managed in each of said resource groups;
    wherein said client computers comprise:
        an application section that, when said maintenance data is transferred from said server computer, detects from said directory of a client computer identification information that identifies said resource group contained in said maintenance data that was transferred, searches for a layer of said directory layers that has said identification information, generates a maintenance target directory for applying said maintenance data by adding a second directory portion, which was registered beforehand, under a first directory portion from a topmost layer of said directories as far as a level having the identification information contained in said maintenance data which was transferred, and applies said maintenance data which was transferred to the maintenance target directory, and
        a monitoring and notification section that monitors to ascertain whether a plurality of items of identical identification information are present in said directories and, if a plurality of items of identical identification information are present, notifies said server computer of abnormality.

2. The distributed computer system according to claim 1, wherein said maintenance data comprises application destination directory information whereby said maintenance data that was registered beforehand is applied; and
    said application section, when said application destination directory is detected from said directory, applies said maintenance data to said application destination directory.

3. The distributed computer system according to claim 1, wherein said application section reads a maintenance protection information file comprising name information of said client computer from said file group and, if the name of the client computer of the maintenance protection information file that has thus been read is its own name, applies to said maintenance target directory said maintenance data that has been transferred.

4. A maintenance data application method in a distributed computer system comprising a plurality of client computers in which is stored a file group including files managed in each prescribed resource group under a directory constituted by a plurality of layers, and a server computer that transfers to each of the client computers maintenance data for updating files managed in each of said resource groups, said method comprising:
    extracting, of generated maintenance data, maintenance data having file update management information more recent than previous file update, management information, according to a management computer managing the maintenance data that was generated and the previous file update management information for each said resource group of said file group;
    transferring the extracted maintenance data to said server computer from said management computer;
    detecting from said directory of a client computer identification information that identifies said resource group contained in said transferred maintenance data, when said maintenance data has been transferred from said server computer;
    searching for a layer of said directory layers that has said identification information;
    generating a maintenance target directory by adding a second directory portion that was registered beforehand under a first directory portion from a topmost layer of said directory as far as a layer having the identification information included in said transferred maintenance data;
    applying said transferred maintenance data to the maintenance target directory;
    monitoring whether a plurality of identical items of identification information are present in said directories;
    notifying said server computer of abnormality, if a plurality of identical items of identification information are present according to the monitoring.

5. The maintenance data application method according to claim 4, wherein said maintenance data comprises application destination directory information as to where said maintenance data that has been registered beforehand is to be applied and
    in said detecting, when said application destination directory is detected from said directory, in said applying, said maintenance data is applied to said application destination directory.

6. The maintenance data application method according to claim 4, wherein, in said applying, a maintenance protection information file having name information of said client computer is read from said file group, and, if the name of the client computer of the maintenance information file that was thus read is its own name, said transferred maintenance data is applied to said maintenance target directory.

7. A recording medium for storing a program to control a distributed computer system, which comprises a plurality of client computers that store file groups containing files managed for each prescribed resource group under a directory constituted by a plurality of layers, and a server computer that transfers to the client computers maintenance data for updating files managed for each said resource group, to provide a maintenance data application according to a process comprising:

extracting, of generated maintenance data, maintenance data having file update management information more recent than previous file update management information, according to a management computer managing the maintenance data that was generated and the previous file update management information for each said resource group of said file group; and transferring the extracted maintenance data to said server computer from said management computer;

detecting from said directory of a client computer identification information identifying said resource group contained in said transferred maintenance data, when said maintenance data has been transferred from said server computer;

searching for a layer of said directory layers that has said identification information;

generating a maintenance target directory by adding a second directory portion that was registered beforehand under a first directory portion from a topmost layer of said directory as far as a layer having the identification information included in said transferred maintenance data, applying said transferred maintenance data to the maintenance target directory;

monitoring whether a plurality of items of identical identification information are present in said directories;

notifying said server computer of abnormality if a plurality of identical items of identification information are present.

\* \* \* \* \*

UNITED STATES PATENT AND TRADEMARK OFFICE
CERTIFICATE OF CORRECTION

PATENT NO.        : 6,961,764 B2                                           Page 1 of 1
APPLICATION NO. : 09/985775
DATED             : November 1, 2005
INVENTOR(S)       : Masatoshi Mizoguchi It is certified that error appears in the above-identified patent and that said Letters Patent is hereby corrected as shown below:

On Title Page Item (56) References Cited, OTHER PUBLICATIONS, change "NETM/DMW-AF $7^{th}$ edition Kaisetsu Sousasho 3000-3-261-60" (197-12-31) Hitachi, Ltd." to -- NETM/DM/W-AF $7^{th}$ edition Kaisetsu Sousasho 3000-3-261-60" (1997-12-31) Hitachi, Ltd. --

Signed and Sealed this

Twenty-fourth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,961,764 B2 Page 1 of 1
APPLICATION NO. : 09/985775
DATED : November 1, 2005
INVENTOR(S) : Masatoshi Mizoguchi It is certified that error appears in the above-identified patent and that said Letters Patent is hereby corrected as shown below:

On Title page item 54 and
Col. 1, line 1, delete the word "DESCRIPTION" in the first line of the Title.

Signed and Sealed this

Twelfth Day of December, 2006

JON W. DUDAS
*Director of the United States Patent and Trademark Office*